May 24, 1960

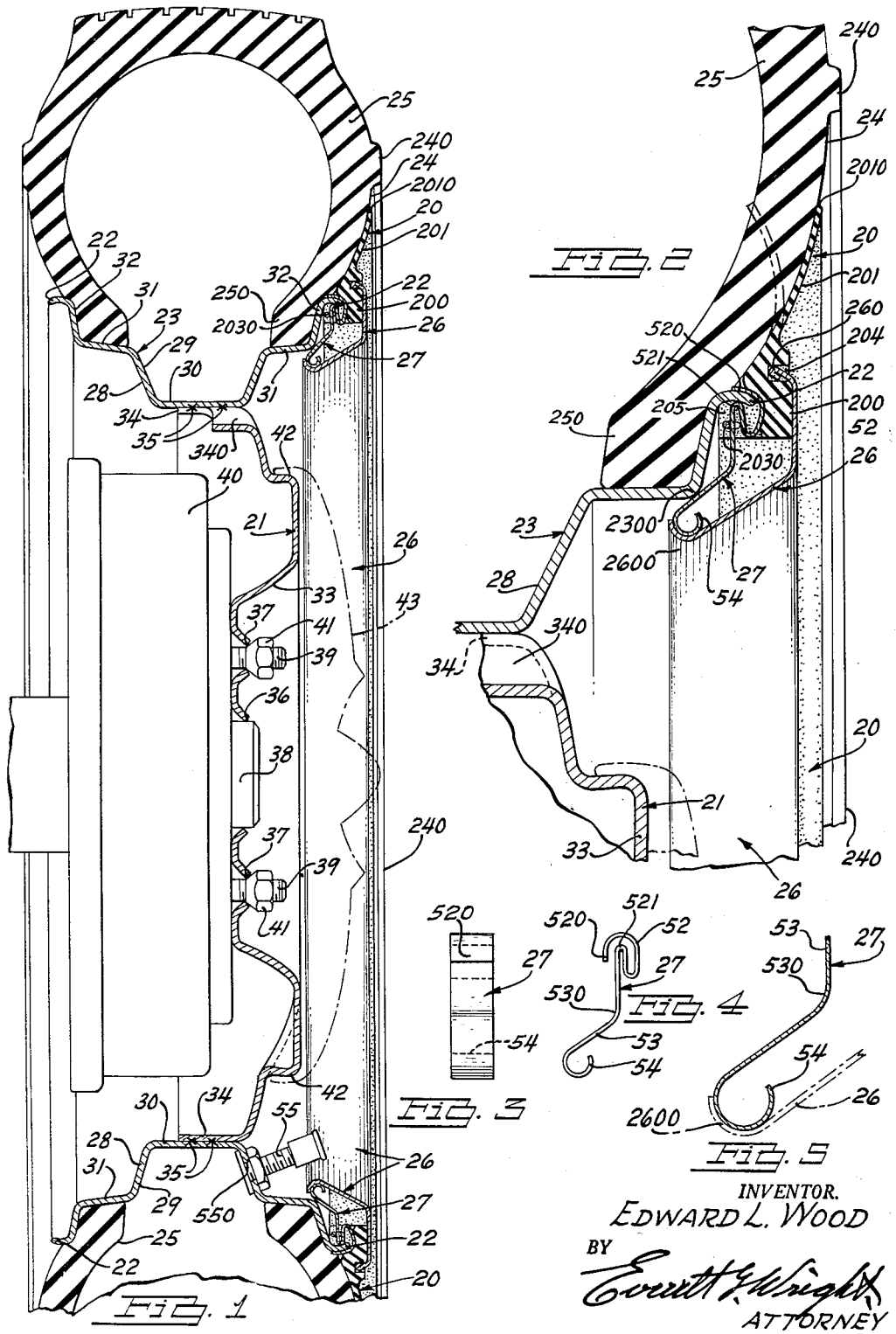

E. L. WOOD 2,937,903

TIRE TRIM

Filed Aug. 22, 1956

INVENTOR.
EDWARD L. WOOD
BY
Everett L. Wright
ATTORNEY

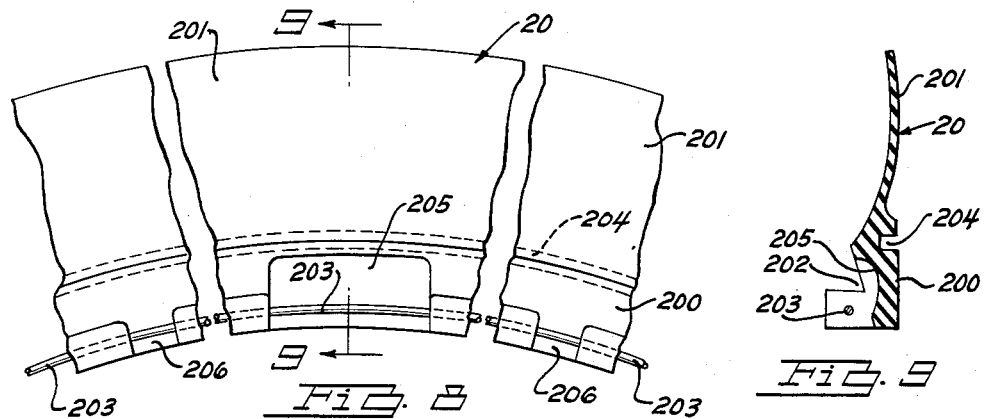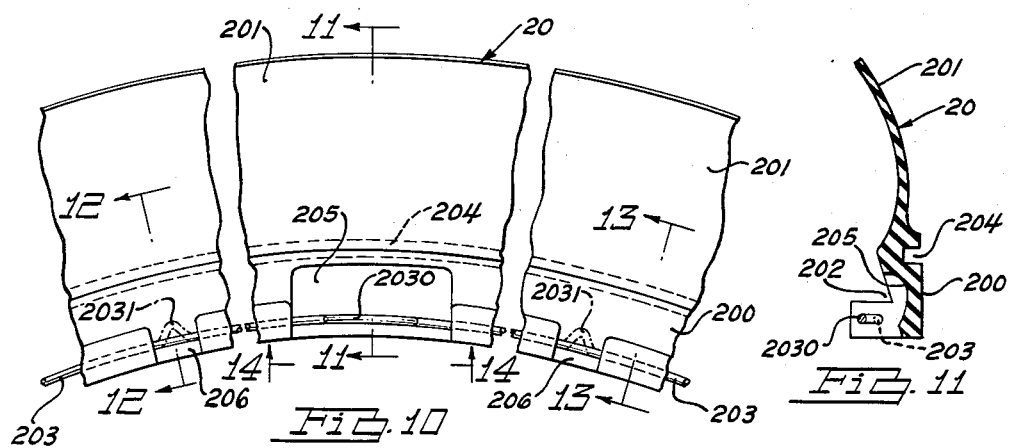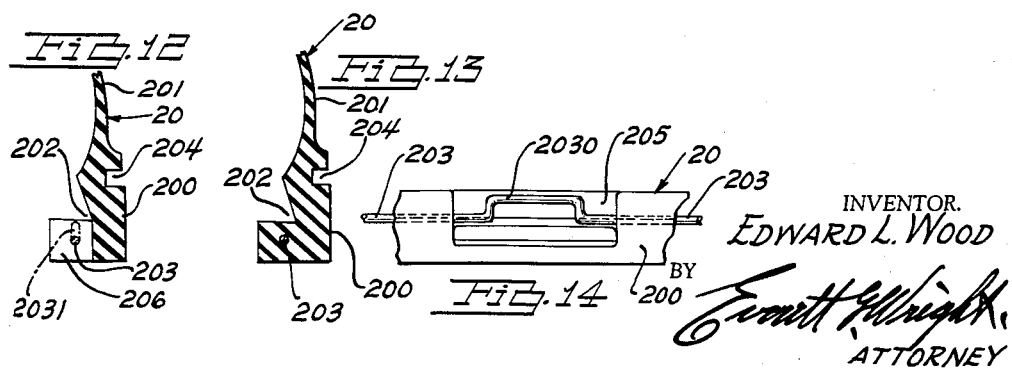

United States Patent Office 2,937,903
Patented May 24, 1960

2,937,903
TIRE TRIM

Edward L. Wood, Detroit, Mich., assignor, by direct and mesne assignments, to Gar Wood Industries, Inc., a corporation of Michigan Filed Aug. 22, 1956, Ser. No. 605,570

11 Claims. (Cl. 301—37)

This invention relates to tire trim employed to ornamentally trim the side walls of tires of automotive vehicles and the like, and to a method of manufacturing the same.

Many attempts have been made to trim the side walls of tires by attaching thereto an annular strip of white or other colored rubber to provide a white or colored side wall effect without having to build the white or other colored side wall integrally into the tire casing. Because of the continued flexing and heating of tire side walls during use, the cementing or other means for fixing annular tire trim strips to the side walls of tires has proven unsatisfactory. Also, the prior art method of providing an annular flap on the inner periphery of an annular tire trim strip and securing the tire trim strip to the tire by inserting the annular flap thereof between the tire and the flange of the wheel rim on which the tire is mounted is considered to be undesirable and unsatisfactory, particularly because such construction is apt to cause leakage between the tire bead and the wheel flange in modern tubeless tire installations, and generally because of the difficulty involved and the time required to mount the tire and the tire trim precisely and correctly onto the rim of a vehicle wheel.

Conventional white side wall tire construction is deemed undesirable because of the high cost of manufacture and the fact that the white rubber built into tire walls ofttimes discolors and crazes long before the safe useful mileage of the tire has been consumed. Also, in the manufacture of conventional white side wall tires, many rejects occur due to flaws which develop in the white wall portion thereof during molding. And, in addition, the automobile dealer is placed to extra expense in changing from black to white side wall tires and vice versa to suit the customer's wishes.

With the foregoing in view, the primary object of the invention is to provide improved and readily attachable and detachable white or colored side wall tire trim for conventional black wall tires, which tire trim is held concentrically onto the vehicle wheel and firmly against the tire by wheel trim and the securing means therefor.

Another object of the invention is to provide a white or colored side wall tire trim attachable to the wheel and tire without the necessity of anchoring it between the tire and the wheel rim.

Another object of the invention is to provide a white or colored side wall tire trim which may be secured to vehicle wheel rims at the lip thereof by improved clip means engaging the lip of the wheel rim, which clip means is employed first to hold the tire trim generally in place and then to secure wheel trim to the vehicle wheel and cause the wheel trim to hold the tire trim concentrically over the lip of the wheel rim and firmly against the tire wall.

A further object of the invention consists in providing a novel combination of tire trim for the tires of automotive vehicle wheels and wheel trim for the vehicle wheels, and simplified securing means, all particularly adapted for use in connection with wheel trim for modern relatively small diameter wheels having relatively wide tires thereon, the said securing means readily engaging the wheel trim to secure the said wheel trim with an over-center type action over the inner periphery of the tire trim for holding both the tire trim and the wheel trim axially and concentrically onto the vehicle wheel.

A further object of the invention is to provide an improved tire trim—wheel trim combination for use on relatively small diameter vehicle wheels with relatively wide tires thereon whereby to utilize the bulge of the tire and/or the scuff rib thereof to prevent scuffing of the tire trim against curbs and the like.

A further object of the invention is to provide an improved tire trim—wheel trim construction consisting of a scuff-proof tire trim in the nature of an annular white or colored ornamental element disposed over the lip of the wheel rim and extending radially outwardly therefrom in firm contact with the wall of the tire mounted thereon, the said tire trim being located radially and axially inwardly from the scuff bead of the tire, or, if the tire has not scuff bead, radially and axially inwardly from the outermost bulge line of the tire, the said tire trim—wheel trim construction including relatively short clip means fixed to the lip of the wheel rim readily engaging narrow wheel trim overlying the inner annual bead of the said tire trim for removably securing the said tire trim and wheel trim axially and concentrically onto said tire and wheel.

An another object of the invention is to provide a molded resilient tire trim consisting of a bead portion disposable concentrically over the lip of a vehicle wheel rim and an annular wall portion arcuately molded and shaped after molding to flex and firmly conform to the curvature of the wall of a tire mounted on said vehicle wheel when properly positioned thereover, the said bead portion being reinforced with a circular wire reinforcement, and the said invention further including a novel method of increasing the ability of the wall portion of the tire trim to conform to the tire wall when properly positioned on the vehicle wheel.

Other objects of the invention will become apparent by reference to the following detailed description taken in connection with the accompanying drawings, in which:

Fig. 1 is a vertical sectional view through a vehicle wheel and tire having thereon a combination of tire trim, wheel trim and securing means illustrating the invention.

Fig. 2 is an enlarged fragmentary sectional view showing in more detail the elements of the invention disclosed in Fig. 1.

Figs. 3 and 4 are front and side elevational views of improved spring clip means employed to snap into engagement with the wheel trim, and to removably secure the tire trim and wheel trim axially and concentrically onto the vehicle wheel.

Fig. 5 is an enlarged fragmentary sectional view showing a preferred relationship of the inner end of the securing clip means and the inner periphery of the wheel trim ring.

Fig. 8 is an enlarged rear elevational view of the tire trim element as molded.

Fig. 9 is a sectional view of the tire trim element taken on the line 9—9 of Fig. 8 showing the curvature of the annular wall portion thereof as molded.

Fig. 10 is an enlarged rear elevational view of the tire trim element as sized and re-shaped after molding.

Fig. 11 is a sectional view taken on the line 11—11 of Fig. 10 with the reinforcement wire in the bead portion of the tire trim element square looped after molding to re-shape and increase the curvature of the wall portion thereof, the said square loops preferably being of sufficient size to permit them to be telescoped onto the securing clip arms.

Fig. 12 is a sectional view taken on the line 12—12 of Fig. 10 showing how the reinforcement wire may be kinked for the purpose of providing additional curvature of the wall portion of the tire trim and/or re-sizing of the bead portion thereof is and when required.

Fig. 13 is a sectional view taken on the line 13—13 of Fig. 10.

Fig. 14 is an elevational view taken on the line 14—14 of Fig. 10 showing the reinforcement wire after it has been square looped.

Figure 6:
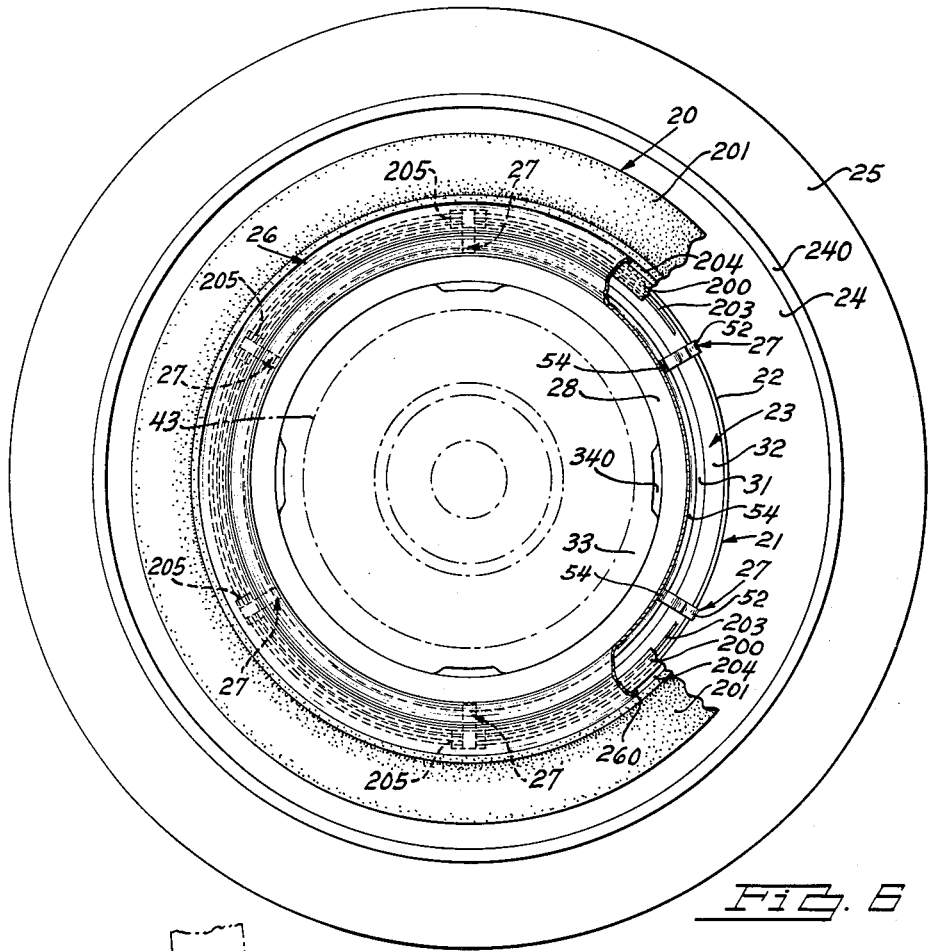
Fig. 6 is an elevational view of the vehicle wheel with a tire mounted thereon, and with tire trim and wheel trim embodying the invention held axially and concentrically thereon by the improved clip means preferably employed, certain portions being broken away to clearly show the relationship of the several elements.
Figure 7:
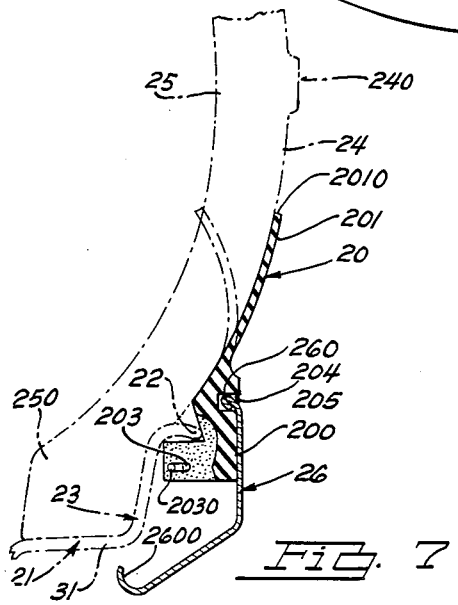
Fig. 7 is an enlarged fragmentary sectional view showing the tire trim as molded and formed indicating how it is flexed and positioned onto the wheel rim and against the wall of the tire.

Referring now to the drawings wherein like numerals refer to like and corresponding parts throughout the several views, the particular embodiment of the invention disclosed for illustrative purposes comprises a tire trim ring 20 molded of rubber, synthetic rubber or other suitable resilient material held firmly by wheel trim 26 onto the lip 22 of the rim 23 of a vehicle wheel 21 and over and against the wall 24 of a tire 25 mounted thereon, the said wheel trim 26 being secured on the said vehicle wheel by suitable securing means 27, all as hereinafter described in detail.

The tire trim ring 20 is formed with an annular bead portion 200 and has an annular wall portion 201 extending radially outwardly therefrom. The said annular bead portion 200 is provided with an axially inwardly facing groove 202 to permit the said bead portion 200 to be axially telescoped on the lip 22 of the rim 23 of the vehicle wheel 21. This groove 202 may be angular in cross section as shown to abut one side of the lip 22 of the wheel rim 23 or it may be narrow to telescope nearly on the said lip 22 in contact with both sides thereof. A circular wire reinforcement 203 is molded into the bead portion 200 of the tire trim ring 20. The said annular bead portion 200 has pockets 205 and notches 206 molded therein at intervals around the axially inwardly disposed face thereof which pockets and notches expose the wire reinforcement 203 as shown in Fig. 8. The pockets 205 accommodate the head 52 of the clips 27, and the said pockets 205 and notches 206 permit the wire reinforcement 203 to be square looped at 2030 and/or crimped at 2031, or otherwise deformed, for the purpose hereinafter described in detail.

Because of unlike shrinkage of the tire trim ring 20 and its reinforcement 203 after the molding thereof, it has been found that the arcuate formation of the annular wall portion 201 of the said tire trim ring 20 becomes relatively less adapted to conform to the wall 24 of the tire 25 than normally would be expected of the resilient material from which the said tire trim ring is molded. It was discovered that, by square looping or kinking or otherwise deforming the circular wire reinforcement 203 of the bead portion 201 of the tire trim ring 20 at intervals therearound, the accuracy and resiliency of the annular wall portion 201 thereof increases so that it will lie more firmly against the wall 24 of the tire 25 when the tire trim 20 is mounted onto the lip 22 of the wheel rim 23 and held thereon by the wheel trim 26 as hereinafter described.

It is essential to satisfactory and continued use of tire trim of the class described that a maximum of firmness in the flexing or crowding of the wall portion 201 of the tire trim 20 toward and against the side wall 24 of the tire 25 be present when the bead portion 200 of the said tire trim 20 is removably telescoped onto the lip 22 of the rim 23 of the vehicle wheel 21 and is held axially in place by wheel trim means 26 under the spring action of the securing clips 27. It is also desirable that the said wheel trim means 26 be formed to engage the tire trim 20 over the annular bead portion 200 thereof and in registry with an axially outward facing annular groove 204 therein preferably located radially outwardly in respect to the axially inwardly facing annular groove 202 in the said bead portion 200 thereof. The method of forming the tire trim 20 to assure this flexing and firm crowding of the wall portion 201 of the tire trim 20 against the tire wall 24 consists of shortening the circular reinforcement wire 203 molded in the bead portion 200 of the said tire trim 20 after the tire trim 20 has been molded and cured. This shortening of the said circular reinforcement wire 203 is best accomplished by crimping the same at suitable intervals therearound, which crimping may take the form of square loops 2030 and/or sharp crimps 2031 formed in the said wire reinforcement 203 at the pockets 205 and notches 206 respectively formed in the rear of the bead portion 200 of the tire trim 20. This square looping or crimping has the effect of forming the wall portion 201 of the tire trim 20 somewhat more arcuate in cross section than by molding whereby to give the said wall portion 201 of the tire trim 20 more ability to flex and crowd itself firmly against the side wall 24 of the tire 25 when urged by the wheel trim 26 thereagainst. Figs. 8 and 9 show the tire trim ring 20 as molded, and Figs. 10–14 inclusive show how the wall portion 201 thereof is formed more arcuate in cross section by resizing the bead portion 200 thereof after molding, it being preferred to mold the bead portion 200 of the said tire trim ring 20 slightly oversize in circumference to accommodate it to being re-sized.

In the more recent automotive vehicle designs, the wheels 21 are being made smaller in diameter and the tires 25 are generally being made wider so that the wall 24 of the tire 25 extends or bulges a considerable distance axially outwardly from the lip 22 of the wheel rim 23. In some tires, the scuff line is further extended axially outwardly by means of a scuff rib 240 molded on the wall 24 of the tire 25 preferably at the bulge line thereof. In the particular embodiment of the tire trim herein disclosed, the outer peripheral edge 2010 of the annular wall portion 201 of the tire trim 20 is preferably located somewhat axially and radially inwardly of the bulge line or scuff rib 240 of the tire 25 to prevent scuffing of the tire trim on curbs and the like, and to provide an improved color or white stripe effect at the juncture of the tire 25 and the wheel trim 26, the said wheel trim 26 covering the annular bead portion of the tire trim 20 telescoped onto the lip 22 of the wheel rim 23. By making the wall portion 201 of the tire trim ring 20 wider, the standard white wall or color wall tire effect may be produced, in which event the tire trim ring 20 would still lie somewhat radially and axially inwardly of the scuff rib 240 of the tire 25.

The wheel trim 26 is shown in the drawings as a ring which may be of any shape and size, and is formed annularly to produce the desired ornamental effect and to cover the lip 22 of the wheel rim 23 and the annular bead portion 200 of the tire trim ring 20. The outer periphery of the wheel trim 26 is preferably formed to provide a somewhat axially inwardly disposed outer annular flange 260 which registers with and engages itself in the axially outwardly facing groove 204 of the tire trim ring 20 to urge it both concentrically onto the lip 22 of the rim 23 and firmly against the wall 24 of the tire 25, all under the axially inward pressure applied to the wheel trim 26 by the wheel trim securing means 27. The inner periphery of the wheel trim 26 is preferably provided with an annular radially outwardly facing groove 2600 of an arcuate cross section formed complementary to the curled trim ring engaging loop 54 of the spring securing means 27.

Although it is generally customary to use stainless steel or chrome plated ornamental rings on vehicle wheels, and the wheel trim ring 26 may be so finished, it is also contemplated that the wheel trim ring 26 may be of cold rolled steel or other suitable material and painted or rubber dipped to provide a finish in the same or contrasting color as the tire trim ring 20, thereby providing various ornamental effects including the effect of an extremely large white wall or colored wall tire. If color other than white is employed, the color selected preferably would be aesthetically compatible with or contrasting to the color of the vehicle having its tires trimmed in accordance with the invention. By using stainless steel wheel trim and a relatively narrow tire trim, an even larger tire effect can be obtained wherein the tire is ornamented with a narrow white or colored stripe adjacent the wheel trim.

A typical vehicle wheel 21 including a tire 25 mounted thereon of the type that may have tire trim—wheel trim combination embodying the invention applied thereto is shown in Figs. 1, 2 and 6. The said vehicle wheel 21 has a drop center rim 23 composed of a central channel or drop center 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 40 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap indicated by the dot and dash lines 43 is sprung for securement onto the vehicle wheel 21. Should the wheel trim 26 be a full wheel cover or the like rather than a wheel trim ring, the hub cap 43 would not be required. The particular tire 25 illustrated in the drawings is a modern tubeless tire. If a tubeless tire 25 is used on the vehicle wheel 21, a valve stem 55 is mounted in sealed relationship through the valve stem aperture 550 provided in the drop center rim channel 28 of the said wheel 21.

The wheel trim securing clips 27 preferably employed to secure the tire trim ring 20 onto the vehicle wheel 21 through the medium of the wheel trim 26 are preferably formed of strip spring steel to provide a reversedly bent and looped rim engaging head 52 and a short arm 53 preferably inwardly bent at 530 and having an outwardly curled wheel trim ring engaging loop 54 at the radially inwardly disposed free end thereof as positioned on the rim 23 of a vehicle wheel 21. The spring clips 27, preferably five or six of them are sprung in uniform circumferential spaced relationship tightly onto the lip 22 of the flange 32 of the wheel rim 23 with the transverse edge of the free leg 520 of the looped head 52 thereof disposed in substantial abutment with the bead 250 of the tire 25 mounted on the drop center rim 23 in the manner required according to the type of tire used. When thusly fixed onto the lip 22 of the rim 23, the arm 53 of the spring clips 27 is sprung toward the circumferential corner 2300 of the wheel rim 23 radially and axially inwardly from the rim lip 22.

The outwardly curled wheel trim ring engaging loop 54 at the free end of the spring clip 27 is preferably of sufficient radius to permit some local flexing thereof, and is formed complementary to the annular radially outwardly facing groove 2600 of the wheel trim ring 26 to engage the said wheel trim ring 26 at the said groove 2600 therein when the said spring clips 27 and wheel trim 26 are sprung into engagement with each other as shown in Figs. 2 and 5.

After the securing clips 27 are properly circumferentially spaced and wedged onto the wheel rim 23 as shown in Figs. 1, 2 and 6, the square loops 2030 in the reinforcement 203 of the tire trim 20 are telescoped onto the arms 53 of the spring clips 27, and the bead portion 200 of the tire trim 20 is positioned over the lip 22 of the wheel rim 23 with the axially inwardly facing groove 202 thereof disposed in registry with the said lip 22 of the wheel rim 23. The securing clips 27 and the wheel trim 26 are then snapped into engagement with each other with the loops 54 of the spring clips 27 in registry with the groove 2600 of the wheel trim ring 26, and the wheel trim 26 is sprung by over-center type action of the securing clips 27 axially inwardly as best shown in Figs. 1 and 2 toward and over the bead portion 200 of the tire trim 20 with the axially inwardly disposed outer annular flange 260 thereof positioned in the axially outwardly facing annular groove 204 of the said tire trim 20.

When the spring clips 27 are properly positioned on the lip 22 of the flange 32 of the wheel rim 23, the free leg 520 of the looped head 52 of the spring clips 27 and the inner reversedly bent portion 521 thereof grip opposite sides of the said lip 22 of the wheel rim flange 32 inwardly from the outer edge thereof, and the short arm 53 thereof may be swung outwardly to permit the loop 54 thereof to be snapped into engagement with the annular groove 2600 of the wheel trim 26. When the loops 54 are all engaged in the annular groove 2600 of the wheel trim 26, the wheel trim 26 is disposed in axially spaced relationship to the wheel rim 23 and the bead portion 200 of the tire trim 20. Pushing the wheel trim 26 axially toward the wheel rim 23 creates an over-center action of the securing clips 27, and the wheel trim 26 becomes spring urged toward the wheel rim 23 and holds the tire trim and itself axially and concentrically onto the lip 22 of the wheel rim 23. Because of the fact that the outer annular flange 260 of the wheel trim 26 applies pressure to the tire trim 20 at the annular groove 204 therearound, the wall portion 201 thereof becomes firmly flexed and held against the wall 24 of the tire 25 mounted on the vehicle wheel 21.

It will be observed that the curled loop 54 of the spring clips 27 is preferably of such a radius as to be somewhat resilient, thus permitting the securing ring 26 and the tire trim 20 to be removed from the vehicle wheel 21 without removal of the said spring clips 27 from the lip 22 of the rim 23 thereof and without undue flexing of the short arm 53 of the said spring clips 27. By varying the relative size and formation of the curled loop 54 of the spring clips 27 and the length and sharpness of the bend 530 of the short arm 53 thereof, the force required to snap the wheel trim ring 26 in place on the spring clips 27, the over-center type action thereof, and the resistance to the removal of the said wheel trim ring 26 therefrom may be adjusted to meet all of the static and shock loading requirements for the proper securement of the wheel trim ring 26 and tire trim 20 to the vehicle wheel 21, and yet permit the removal of the wheel trim 26 and tire trim 20 from the said vehicle wheel without damage thereto and without damage to the said clips 27.

Although but a single embodiment of the improved tire trim—wheel trim construction and securing means embodying the invention has been disclosed herein together with the disclosure of a preferred method employed to manufacture the tire trim element to impart improved qualities thereto in its particular use, it is obvious that many changes may be made in the size,

I claim:

1. In combination, tire trim for tires of vehicle wheels comprising an annular resilient tire trim ring having an inner annular bead portion formed to overlie the lip of the wheel rim, the said annular bead portion having a plurality of uniformly circumferentially spaced pockets formed in the axially inner face thereof, and an outer annular wall portion adapted to conform resiliently and firmly to the wall of the vehicle tire responsive to axial pressure applied to said tire trim over the said bead portion thereof, the said tire trim bead portion including a circular wire reinforcement embedded therein and exposed at said pockets, wheel trim, and spring clip means telescoped onto the lip of the wheel rim securing said wheel trim axially onto said wheel and over said tire trim bead, the exposed portions of said tire trim bead reinforcement being telescoped onto said clip means at the said pockets in said bead portion to position said tire trim on said wheel prior to being secured thereonto by said wheel trim.

2. In combination with wheel trim and wheel trim securing means fixed onto the lip of the rim of a vehicle wheel having a tire mounted thereon, said wheel trim securing means being adapted to urge said wheel trim onto said vehicle wheel exerting axial pressure toward the lip of the rim thereof, tire trim for the tire of said vehicle wheel comprising an annular resilient tire trim ring having an outer annular wall portion and inner annular bead portion including a circular wire reinforcement therein, the said inner annular bead portion of said tire trim being disposed over the lip of the rim of said vehicle wheel and under said wheel trim and notched at intervals therearound to expose said wire reinforcement, said wheel trim securing means engaging the exposed reinforcement of said tire trim to position it concentrically on said wheel prior to the said wheel trim being urged by said wheel trim securing means axially into engagement with said tire trim to hold it firmly onto said wheel with the annular wall portion thereof flexed firmly against the wall of the tire thereon.

3. In combination with a vehicle wheel including a rim and a tire mounted thereon, means for trimming the tire of said vehicle wheel and said wheel comprising a resilient annular tire trim ring including an inner annular bead portion and an arcuately formed outer wall portion, clip means telescoped onto the lip of the wheel rim sprung radially and axially inwardly therefrom, the bead portion of said tire trim ring having an inner annular groove therein to permit the said bead portion to be telescoped concentrically onto the lip of said wheel rim, and an ornamental wheel trim ring disposed over the bead portion of said tire trim ring including a curled inner periphery sprung into engagement with said clip means removably fixing said tire trim ring and said ornamental wheel trim ring as a unitary structure concentrically onto said vehicle wheel.

4. The combination claimed in claim 3 wherein the tire trim ring is provided with an outer annular groove therein and the outer periphery of the wheel trim ring is disposed axially inwardly to register in said annular groove in said tire trim ring and apply local axial pressure thereat.

5. The combination claimed in claim 4 wherein the outer annular groove in said tire trim ring is located radially outwardly with respect to the said inner annular groove in the bead portion thereof.

6. The combination claimed in claim 3 wherein the bead portion of the said tire trim ring is molded with an annular reinforcement therein exposed at uniformly spaced intervals therearound and crimped where exposed to increase the accuracy of the said outer wall portion of said tire trim ring and the ability thereof to flex firmly against the wall of said tire.

7. In combination with a vehicle wheel including a rim and a tire mounted thereon, means for trimming the tire of said vehicle wheel comprising a resilient molded annular tire trim ring including an inner annular bead portion and an arcuately formed outer portion, clip means telescoped onto the lip of the wheel rim and sprung radially and axially inwardly toward the side of said wheel rim, said bead portion of said tire trim ring having an inner annular groove therein to permit said bead portion to be telescoped concentrically onto the lip of the rim of said wheel, and a wheel trim ring having an outer axially inwardly formed periphery disposed over the annular bead portion of the said tire trim and an inner curled periphery sprung into engagement with said clip means removably fixing said tire trim onto said vehicle wheel.

8. The combination claimed in claim 7 wherein the bead portion of said tire trim ring has a wire reinforcement molded therein and pockets uniformly spaced therearound exposing the said reinforcement, the said reinforcement being square looped to permit telescoping the same onto said clip means whereby to position the said tire trim onto the lip of said wheel rim prior to it being held firmly thereon by said wheel trim.

9. In combination with a vehicle wheel including a rim having an axially disposed lip and a tire mounted on said rim, means for trimming the tire on said wheel comprising a resilient annular tire trim ring including an inner annular bead portion and an outer arcuately formed wall portion adapted to flex against the wall of said tire when the inner annular bead portion is positioned over the lip of said wheel rim, spring clip means telescoped onto the lip of the wheel rim and sprung radially and axially inwardly toward the side of said wheel rim, said spring clip means including a looped inner end, an annular wire reinforcement in said bead portion, said bead portion having an inner annular groove and circumferentially spaced pockets therein, the said pockets exposing said wire reinforcement, the said annular groove permitting the said bead portion to be telescoped concentrically onto the lip of the rim of said wheel and the said pockets permitting said spring clips to engage the said reinforcement and position the tire trim concentrically onto the vehicle wheel, and a wheel trim ring interlocked over the bead portion of said tire trim and having an inner curled periphery sprung into locking engagement with said looped inner end of said clip means removably fixing said tire trim onto said vehicle wheel with axial pressure thereagainst.

10. The combination claimed in claim 9 wherein the wire reinforcement of the bead portion of the tire trim is shortened after molding by kinking the same at intervals therearound whereby to increase the accuracy of the wall portion of said tire trim and increase its ability to maintain itself firmly against the wall of said tire when the tire trim is held axially onto said wheel by said wheel trim.

11. In combination, a wheel rim including a circumferentially disposed radial outer tire bead flange terminating in an axially disposed circumferential lip, a tire mounted on said wheel rim, a plurality of loop type clip means spaced around said wheel rim lip overlying the top thereof and formed to engage the bottom thereof, a tire trim element consisting of an annular bead portion and an arcuately formed generally radially disposed outer portion, the said annular bead portion being notched opposite said clips and having therein an axially inner annular groove forming a radially outwardly facing annular seat, said annular groove in said bead portion permitting the telescoping of said bead portion axially on the circumferential lip of said wheel rim with the said annular seat of said bead portion positioned against the bottom of said circumferential wheel rim lip, and an annular securing ring generally angular in cross section assembled onto the outer periphery of said bead portion of said tire trim element encompassing the axially outer periphery of said tire trim bead portion and flanged thereover, said annular securing ring having a curled radially inwardly disposed leg sprung into engagement with said loop type clip means removably fixing itself and said tire trim ring onto said vehicle wheel with the outer portion of said tire trim ring element disposed adjacent the outer wall of said tire.

References Cited in the file of this patent

UNITED STATES PATENTS

| | | |
|---|---|---|
| 1,968,076 | Goodyear et al. | July 31, 1934 |
| 2,540,932 | Clark | Feb. 6, 1951 |
| 2,576,736 | Watkins | Nov. 27, 1951 |
| 2,668,329 | Landau | Feb. 9, 1954 |
| 2,691,550 | Nickerson | Oct. 12, 1954 |
| 2,737,422 | Barnes | Mar. 6, 1956 |

FOREIGN PATENTS

| | | |
|---|---|---|
| 1,061,278 | France | Nov. 25, 1953 |